United States Patent
Okumura et al.

[11] Patent Number: 5,401,065
[45] Date of Patent: Mar. 28, 1995

[54] FLUID COUPLING

[75] Inventors: Katsuya Okumura, Yokohama; Kenichi Goshima, Kasugai, both of Japan

[73] Assignees: Kabushiki Kaisha Toshiba; CKD Corporation, Japan

[21] Appl. No.: 57,572

[22] Filed: May 6, 1993

[30] Foreign Application Priority Data

May 11, 1992 [JP] Japan .................................. 4-146645
May 11, 1992 [JP] Japan .................................. 4-146646

[51] Int. Cl.⁶ ............................................. F16L 25/00
[52] U.S. Cl. ................................... 285/328; 285/353; 285/354; 285/369; 285/388; 285/906
[58] Field of Search ............... 285/354, 386, 387, 388, 285/353, 385, 369, 384, 341, 906, 328

[56] References Cited

U.S. PATENT DOCUMENTS

| | | | |
|---|---|---|---|
| 459,910 | 9/1891 | Hogan | 285/388 |
| 906,099 | 12/1908 | Burgess | 285/353 X |
| 1,675,808 | 7/1928 | Kliss | 285/388 |
| 2,567,113 | 9/1951 | Kristensen | 285/353 X |
| 4,076,286 | 2/1978 | Spontelli | |
| 4,435,005 | 3/1984 | Berger et al. | 285/388 X |
| 4,685,707 | 8/1987 | Miyashita | 285/354 X |
| 4,811,976 | 3/1989 | Yagisawa | 285/354 X |

FOREIGN PATENT DOCUMENTS 2-46830 10/1990 Japan .
286734 2/1965 Netherlands ......................... 285/354

*Primary Examiner*—Dave W. Arola
*Attorney, Agent, or Firm*—Finnegan, Henderson, Farabow, Garrett & Dunner

[57] ABSTRACT

A fluid coupling provides a cap nut having an internal screw formed inside, a pipe having a mirror-finished surface formed at an end face and a groove in an outer periphery, a device for preventing rotation of the pipe together with the cap nut, in contact with the inner end face of the cap nut, a ferrule fitted in the groove formed in the outer periphery of the pipe, in contact with the device for preventing the rotation of the pipe together with the cap nut, the ferrule which transmits to the pipe a thrust of the cap nut in the pipe's longitudinal direction, a gasket fitted on an end part of the pipe, with the end face of the pipe in contact with the gasket through the entire circumference, and a body mirror-finished at the end face and provided with an external screw formed on the outer periphery, wherein the end face of the body is in contact with one side of the gasket the other side of which is in contact with the pipe, and the external screw of the body and the internal screw of the cap nut is tightened to a specific torque.

12 Claims, 8 Drawing Sheets

FLUID COUPLING

BACKGROUND OF THE INVENTION

1. Field of the Invention

The present invention relates to a fluid coupling to be used in a gas supplying apparatus used in an industrial manufacturing equipment such as a semiconductor manufacturing equipment and, more particularly, to a gas coupling having high gas tightness to be used in an apparatus for supplying a toxic gas.

2. Description of Related Art

In a semiconductor manufacturing process, extremely poisonous gases such as silane, arsine, phosphine, diborane, etc. have been used as dopants which are thermally diffused in a silicon base. Also used is a spontaneous-ignitable gas.

For example, the lethal dose of arsine is 0.5 ppm, and even a little leakage of the gas presents a serious danger to a user. A piping used for these poisonous gases, therefore, has in principle been connected by welding for the purpose of preventing their leakage.

Figure 12:
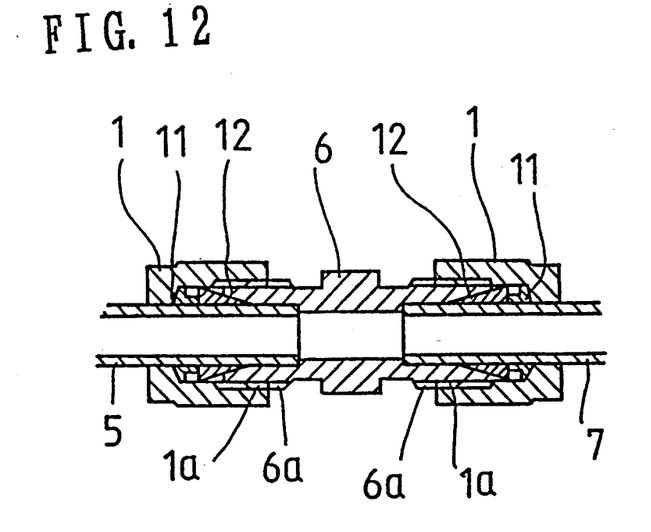
FIG. 12 is a sectional view showing the constitution of a prior art fluid coupling.

In the meanwhile, for a nonpoisonous gas such as compressed air, pipes to be used are connected by a coupling shown in FIG. 12, not by welding.

In both ends of a through hole made in a body 6 are inserted pipes 5 and 7. On the outer periphery of the body 6 is formed an external screw 6a, which is in engagement with an internal screw 1a formed inside a cap nut 1.

The through hole of the body 6 is largely chamfered on the inlet side; in the chamfered part is fitted a sleeve 12 having a wedge-shaped section. At the center of the sleeve 12 is formed a through hole, in which the pipes 5 and 7 are fitted.

On the bottom face of the sleeve 12 is installed a washer 11 for preventing the sleeve 12 from turning together. The end face on the opposite side of the washer 11 is in contact with the end face inside of the cap nut 1. At the center of the sleeve 12 is formed a through hole, in which the pipes 5 and 7 are fitted.

In a coupling of such a constitution, when the cap nut 1 is tightened to a specific torque onto the body 6, the sleeve 12 is pressed inwardly by the body 6, coming into contact with the outer periphery of the pipes 5 and 7 to deform these pipes 5 and 7.

Thus, the gas tightness of the coupling can be assured by obtaining close contact between the outer peripheral surface of the pipes 5 and 7 and the inner surface of the sleeve 12 and between the outer peripheral surface of the sleeve 12 and the inner surface of the chamfered section of the body.

However, the coupling shown in FIG. 12 has the following problems:

(1) that it has insufficient gas tightness, and therefore is unsuitable for use in piping for poisonous gases;

(2) that it is unremovable without disconnecting the pipes 5 and 7 from the body 6, and therefore, it becomes necessary to provide the piping with a sufficient relief for removal of the coupling; and (3) that it is likely to be deteriorated in gas tightness at the time of removal and reassembly because the pipe, once jointed, is deformed by compression.

The use of the coupling is required, for example, in connecting the piping with a valve in spite of the above-described problems; the coupling shown in FIG. 12, therefore, is used with an utmost heed in a semiconductor fabricating process where poisonous gases are handled.

However, there has recently been used a coupling disclosed in Japanese Patent Publication No. HEI 2-46830 and other as a means for solving the above-described problems which is capable of maintaining high gas tightness.

A sleeve of this coupling, however, is connected to a pipe of a piping by welding because the sleeve is of a special shape.

Piping connection by welding, however, results in the following problems when poisonous gases are used as a source of dopants to be used for thermal diffusion.

(1) In the course of welding, there occur floating elements, which go as metallic impurities into a wafer, deteriorating device dependability.

(2) Most gases used as a source of dopants have corrosiveness; pipes usually employed are produced of an SUS steel, which is susceptible to a thermal change and corrosion in the welded part by welding. Therefore, there occur particles, which increase a fraction defective due to the presence of a pattern defect.

(3) The welding of SUS steel pipes requires a high welding technique; it has been not easy to employ skilled welding operators in the field of construction of a semiconductor manufacturing process.

SUMMARY OF THE INVENTION

The present invention has been made in view of the above circumstances and has an object to solve the above problems and to provide an easy-to-install fluid coupling for use in a semiconductor manufacturing process and others where occurrence of few metallic impurities and particles is demanded.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, there is provided a fluid coupling of such a constitution as described below in accordance with a first aspect of the present invention.

(1) The fluid coupling comprises: a cap nut having an internal screw formed inside; a pipe having a mirror-finished surface formed at an end face and a groove in the outer periphery; a means for preventing the pipe from turning together with the cap nut, in contact with the inner end face of the cap nut; a ferrule fitted in the groove formed in the outer periphery of the pipe, in contact with the means for preventing the turning of the pipe together with the cap nut, for transmitting to the pipe a thrust of the cap nut in the longitudinal direction of the pipe; a gasket fitted on an end part of the pipe, with the end face of the pipe in contact with the gasket through the entire circumference; and a body mirror-finished at the end face and provided with an external screw formed on the outer periphery; the end face of the body being in contact with one side of the gasket the other side of which is in contact with the pipe; the external screw of the body; and the internal screw of the cap nut being tightened to a specific torque.

(2) The fluid coupling comprises: a cap nut having an internal screw formed inside; a first pipe mirror-finished at an end face and having a groove in the outer periphery; a first means for preventing the first pipe from turning together with cap nut, in contact with the inner end face of the cap nut; a first ferrule fitted in the groove formed in the outer periphery of the first pipe, and in contact with the first means for preventing the first pipe from turning together with the cap nut, for transmitting the thrust of the cap nut to the first pipe in the longitudinal direction of the pipe; a body having an external screw formed in the outer periphery; a second pipe mirror-finished at an end face and having a groove formed in the outer periphery; a second means for preventing the second pipe from turning together with the cap nut, in contact with the end face of the body; a second ferrule fitted in the groove in the outer periphery of the second pipe, in contact with the second means for preventing the turning of the second pipe together with the cap nut, for transmitting the thrust of the cap nut to the second pipe in the direction of the pipe; and a gasket fitted on the end part of the first or the second pipe, in contact with the end faces of the first and second pipes, from both faces, through the entire circumference; the external screw of the body and the internal screw of the cap nut being tightened to a specific torque.

Next, a method for installing the fluid coupling of the above-described constitution according to the present invention will be explained.

The pipe fitted with the ferrule and the gasket is inserted into the cap nut on which a thrust bearing has been mounted, and then the cap nut is screwed onto the body.

At this time, the ferrule having slits expands in the inside diameter due to the presence of the slits when it is fitted in the groove in the outer periphery of the pipe, or two or more ferrule parts are assembled in the radial direction and fitted in the groove in the outer periphery of the pipe.

Then, the cap nut is screwed in to a specific torque with the body locked from turning.

When the cap nut is screwed onto the body, the thrust is transmitted to the pipe through the ferrule.

At this time, since the pipe has been positioned by the ferrule with respect to the cap nut, the end faces of the pipe and the body are properly aligned.

Here, the end faces of the pipe and the body have been mirror-finished by roller burnishing, thereby improving close contact between the pipe end face and the gasket and between the body end face and the gasket and accordingly also improving the gas tightness of the coupling.

The Vickers hardness of the SUS material is about 180 kg, which can be increased to about 300 kg by mirror-finishing by roller burnishing. The pipe end face and the body end face will never be deformed if pressed against the gasket with a great pressure and therefore is repetitively usable.

The gasket is pressed on both ends by the pipe end face and the body end face. The gasket, produced of a soft metal, fits well gas tight between the pipe end face and the body end face which are made of materials of high hardness.

Since a thrust bearing is mounted as a means for preventing the turning of the pipe when the cap nut is screwed onto the body, the pipe can be prevented from turning together with the cap nut.

Furthermore, with the cap nut removed, the pipe can easily be disconnected simply by sliding in an radial direction of the pipe.

According to the fluid coupling of the present invention, as is clear from the above explanation, it is possible to easily install the ferrule by adding simple working to ordinary pipes. Pipe connection, therefore, can be connected with high gas tightness without welding, and accordingly it will not be caused, by welding, to occur any floating elements which, as metallic impurities, enter a wafer to deteriorate device dependability.

Furthermore, since the material will not be affected by welding, there will occur no particles which become a cause of a pattern defect and a lowered fraction defective.

Furthermore, because of easy assembly, the construction of the semiconductor manufacturing process can be performed efficiently without requiring a skilled welding operator.

Furthermore, the pipe can easily be disconnected simply by sliding in the radial direction after the removal of the cap nut; therefore it is not necessary to provide the piping with a relief, which can reduce a manufacturing cost.

BRIEF DESCRIPTION OF THE DRAWINGS

The accompanying drawings, which are incorporated in and constitute a part of this specification, illustrate an embodiment of the present invention and, together with the description, serve to explain the objects, advantages and principles of the present invention. In the drawings.

DESCRIPTION OF THE PREFERRED EMBODIMENTS

A detailed description of one preferred embodiment of a fluid coupling embodying the present invention will now be given referring to the accompanying drawings.

Figure 1:
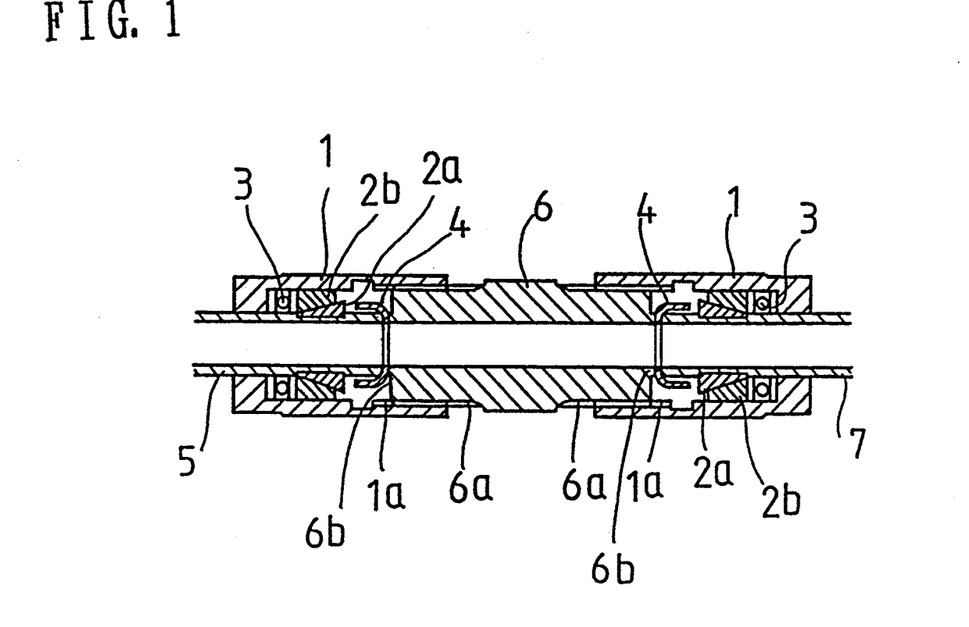
FIG. 1 is a sectional view showing the constitution of a fluid coupling in a first embodiment according to the present invention.
Figure 3:
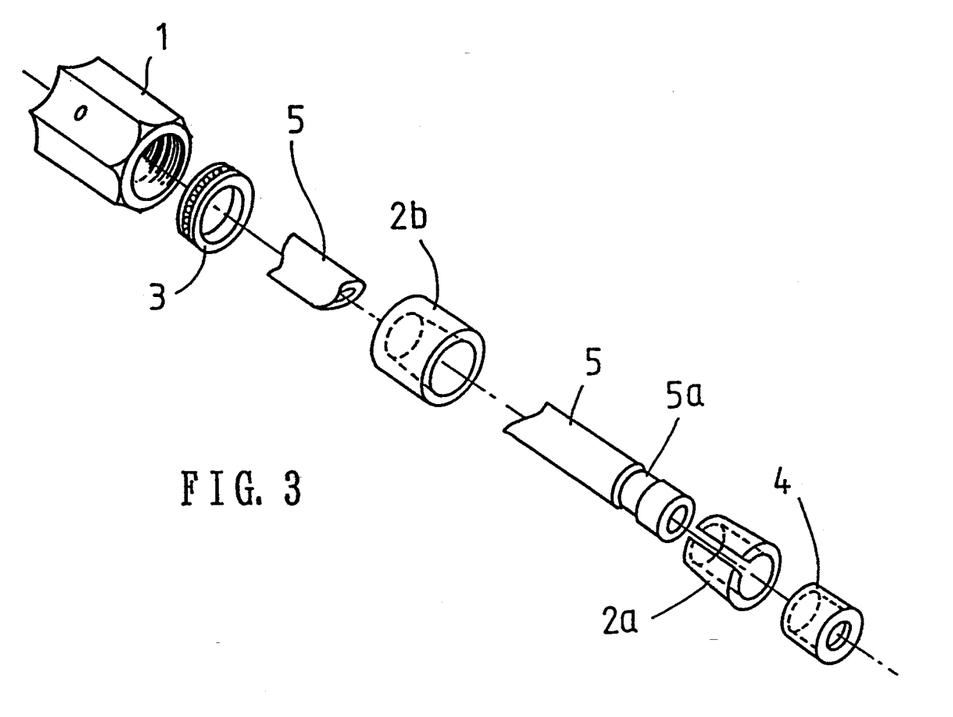
FIG. 3 is an exploded perspective view showing the constitution of essential parts of the first embodiment.

FIG. 1 is a sectional view showing one preferred embodiment in which pipes are connected to both ends of a coupling body. FIG. 3 is an exploded perspective view showing the constitution of essential parts of a coupling.

A thrust bearing 3 is fitted in contact with the end face inside a cap nut 1 inside which an internal screw 1a is formed.

Figure 4:
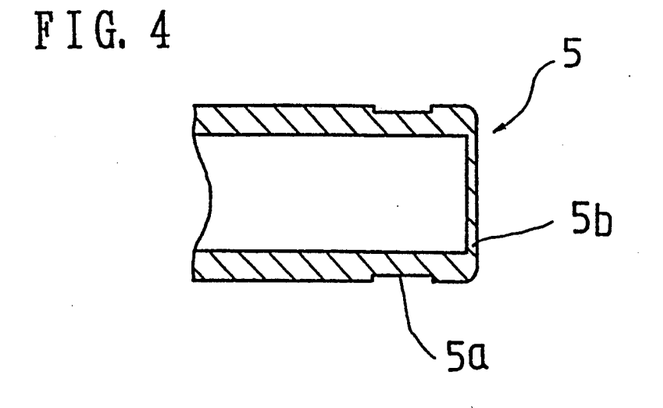
FIG. 4 is a sectional view of a pipe end part.

Inside the thrust bearing 3 is installed a pipe 5. The pipe 5 is chamfered at the forward end of the end face part as shown in FIG. 4, and a forward end face 5b is mirror-finished by roller burnishing.

The pipe 5 is provided with a groove 5a in the peripheral surface.

In this groove 5a is fitted a sleeve 2a of wedge-shaped section having slits in a longitudinal direction. A sleeve 2b having the same inclined surface inside as the wedge-shape inclination of the sleeve 2a is fitted on the sleeve 2a. The sleeve 2a and the sleeve 2b thus fitted make the ferrule.

The sleeve 2a which is a first ferrule part has a wedge-shaped section; its end face of a small area is located on the thrust bearing 3 side. The sleeve 2b which is a second ferrule part has a trapezoidal section and is installed so that its end face having a large area will come in contact with the thrust bearing 3.

A gasket 4 is installed with its inner surface fitted on the end part of the pipe 5 and with its inner end face in contact with the entire outer surface of the pipe end face 5b.

A body 6 finished at an end face 6b by roller burnishing has an external screw 6a on the outer periphery; this external screw 6a is fastened into the internal screw 1a of the cap nut 1.

The end face 6b of the body 6 is in contact with one side of the gasket 4 with the other side of which the pipe end face 5b is in contact.

The mounting structure of a pipe 7 on the opposite side is the same as that of the pipe 7, and therefore will not be described.

Next, the function of the fluid coupling having the above-described constitution will be explained.

The pipes 5 and 7 to be connected are cut to a specific length for practical use, chamfered at end faces, and then mirror-finished by roller burnishing. Roller burnishing operation can easily be performed by use of a portable roller burnishing machine. Thus, mirror-finishing by roller burnishing insures firm contact between the pipe end face 5b and the gasket 4, thereby improving the gas tightness of the coupling.

The Vickers hardness of the SUS material is about 180 kg, which, however, can be increased to about 300 kg by roller burnishing. The pipe end face 5b will not undergo deformation if pressed firmly against the gasket with a great pressure, and therefore the fluid coupling can sustain repetitive use.

In the peripheral surface of the pipe 5 is cut the groove 5a as shown in FIG. 4, by machining on a lathe or other.

It is, therefore, possible to cut the groove in the outer surface of the pipe with ease where such a lathe is available.

Installed in the groove 5a of the pipe 5 is the sleeve 2a with the slit widened to fit to the inclination of the outer surface of the sleeve 2a. Also the gasket 4 is fitted on the end part of the pipe 5.

The pipes 5 and 7 thus fitted with the gasket 4 and the ferrule 2 which is composed of a combination of the sleeves 2a and 2b are inserted into the cap nut 1 fitted with the thrust bearing 3 inside, and the cap nut 1 is screwed into the body 6.

With the body 6 locked from turning, the cap nut 1 is screwed in to a specific torque.

As the cap nut 1 is tightened into the body 6, its thrust is transmitted to the pipes 5 and 7 through the ferrule 2. The sleeve 2a constituting the ferrule is fitted in the groove 5b formed in the outer periphery of the pipe, and the thrust is transmitted from this sleeve 2a to the sleeve 2b by a wedge effect. The ferrule 2, therefore, can transmit a great thrust to the pipe.

At this time, since the pipe 5 has been positioned by the ferrule 2 in relation to the cap nut 1, the end face 5b of the pipe and the end face 6b of the body 6 are properly aligned.

Since the body end face 6b has been mirror-finished by roller burnishing, a close contact is obtained between the body end face 6b and the gasket 4, improving the gas tightness of the fluid coupling.

Furthermore, the Vickers hardness, about 180 kg, of the SUS material can be increased to about 300 kg by performing the roller burnishing. The body end face 6b, therefore, will not be deformed even if the body end face 6b is firmly pressed against the gasket under a great pressure, and accordingly can withstand repetitive use.

The gasket 4 is compressed from both sides with the end face 5b of the pipe and the end face 6b of the body 6. This gasket 4, in the present embodiment, being made of nickel, can contact well the end face 5b of the pipe and the end face 6b of the body 6 which have high hardness, when compressed.

The gasket 4 once installed becomes deformed, and therefore should be replaced with a new gasket 4 when the fluid coupling is reassembled. The gasket 4 of the present embodiment is properly positioned simply by fitting on the pipe 5, and therefore, replacement of this gasket 4 can easily be performed.

Since the thrust bearing 3 is mounted in the cap nut 1, the turning of the pipe together with the cap nut 1 can be prevented when the cap nut 1 is tightened onto the body 6. Therefore, there will never take place a rubbing phenomenon between the pipe end face 5b and the gasket 4 or between the gasket 4 and the body end face 6b, and accordingly no unwanted particles will occur.

According to the fluid coupling of the aforesaid constitution, the ferrule 2 can easily be installed simply by adding simple machining to ordinary pipes; and therefore the pipes can be connected with high gas tightness without welding.

Furthermore, with the cap nut 1 removed, the pipe 5 can be disconnected with easiness only by sliding the pipe 5 in an radial direction. It is, therefore, possible to lower the manufacturing cost without providing the piping with an excess relief.

The pipe end face 5b and the body end face 6b have been mirror-finished by roller burnishing, to thereby insure close contact of these end faces with the gasket 4. The fluid coupling, therefore, can be constituted with a high gas tightness.

Furthermore, since the pipe end face 5b and the body end face 6b have high hardness, only the gasket 4 is subjected to deformation. The fluid coupling, therefore, becomes repetitively usable simply by replacing only the gasket 4.

Figure 2:
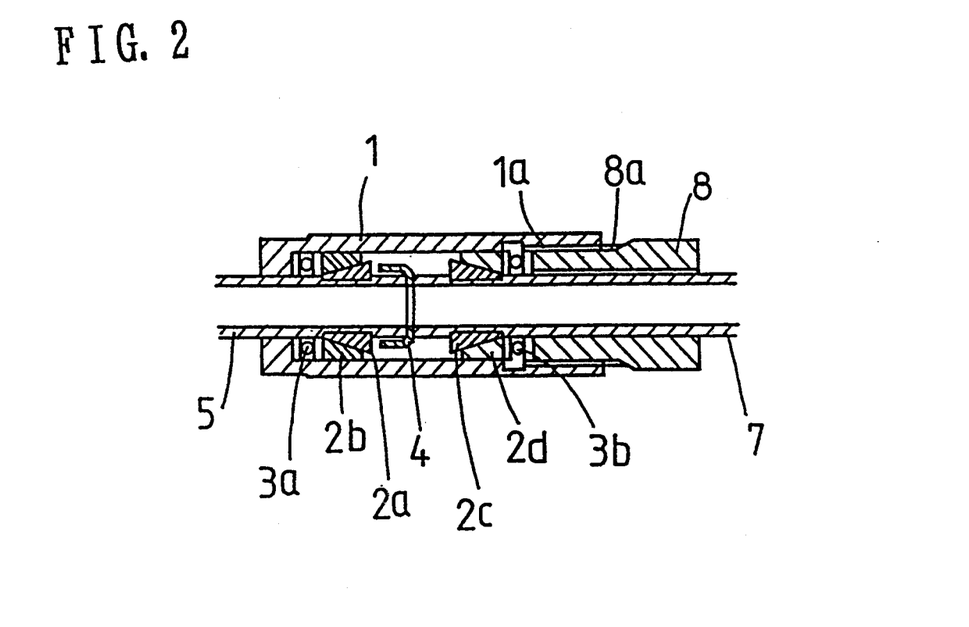
FIG. 2 is a sectional view showing the constitution of a fluid coupling in a second embodiment according to the present invention.

Next, a second embodiment of the present invention will be explained referring to FIG. 2. The second embodiment is a fluid coupling using one cap nut for connecting a set of pipes.

A first thrust bearing 3a is fitted in contact with the end face inside the cap nut 1 having an internal screw 1a on the inside diameter.

In the thrust bearing 3a is installed a pipe 5, or the first pipe. The end face part of this pipe 5, as shown in FIG. 4, has been chamfered at the forward end, and a forward end face 5b has been mirror-finished by roller burnishing.

The pipe 5 is provided with a groove 5a cut in the peripheral surface.

In the groove 5a is fitted a sleeve 2a of a wedge-shaped section which has slits in the longitudinal direction. A sleeve 2b having the same inclination as the wedge-shaped inclination of the sleeve 2a is fitted in the sleeve 2b, forming a ferrule 2.

The sleeve 2a which is the first ferrule part has a wedge-shaped section, whose end face of a small area is located on the thrust bearing 3 side. The sleeve 2b which is the second ferrule part has a trapezoidal section, and mounted so that the end face of a large area will contact the thrust bearing 3.

A gasket 4 is mounted with its inner surface fitted on the end part of the pipe 5 and with its inner end face in contact with the entire periphery of the pipe end face 5b.

Inside the cap nut 1 is installed a pipe 7 which is the second pipe with its end face finished by roller burnishing.

The end face part of the pipe 7 is also similarly mirror-finished by roller burnishing like the pipe end face 5b.

The pipe 7 is provided with a groove 7a cut in the peripheral surface. In this groove 7a is fitted a sleeve 2c of wedge-shaped section which has slits. Furthermore a sleeve 2d having the same inner surface inclination as the wedge-shaped inclination of the sleeve 2c is fitted to the sleeve 2c. The sleeves 2c and 2d thus combined form the ferrule 2.

The sleeve 2d which is the second ferrule part of trapezoidal section is mounted such that the end face having a large area will contact the thrust bearing 3b.

A second thrust bearing 3b is mounted in contact with the ferrule 2. The end face of a body 8 having an external screw 8a in the outer periphery is in contact with this thrust bearing 3b.

Next, the function of the second embodiment will be explained.

With the body 8 locked from turning, a cap nut 1 is tightened to a specific torque.

A thrust produced when the cap nut 1 is screwed into the body 6 is transmitted to the pipes 5 and 7 through the ferrule 2. Since the sleeve 2a constituting the ferrule is fitted in the groove 5a formed in the outer periphery of the pipe, the ferrule 2 can transmit a strong thrust to the pipes.

At this time, since the pipes 5 and 7 are positioned by the ferrule 2 with respect to the cap nut 1, the end face 5b of the first pipe and the end face 7b of the second pipe are properly aligned.

Also, a set of pipes 5 and 7 are abutted against the gasket mounted therebetween and pressed for connection.

The pipe end faces 5b and 7b are finished by roller burnishing to insure good gas tightness by close contact with the nickel gasket 4 which is deformed when compressed.

According to the embodiment described above, a high gas tightness is obtainable to fully eliminate a hazard in handling poisonous gases in the semiconductor manufacturing process.

The pipes can easily be disconnected only by sliding in an axial direction after the removal of the cap nut, thereby facilitating maintenance of the fluid coupling.

Figure 5:
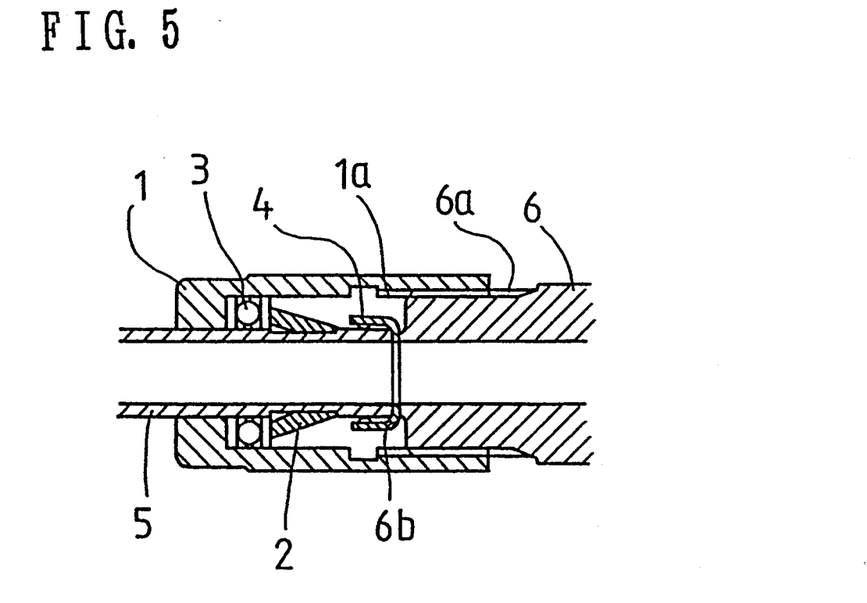
FIG. 5 is a sectional view showing the constitution of a part of a fluid coupling in a third embodiment according to the present invention.

Next, a third embodiment will be explained referring to FIG. 5. A difference of the third embodiment from the first embodiment resides only in the shape of the ferrule; therefore mainly the ferrule will be explained. No explanation will be made on other parts.

The ferrule 2 is wedge-shaped in section, and mounted with the end face of large area held in contact with the thrust bearing 3. The ferrule 2 has slits in the outer periphery, which are expanded to allow the ferrule 2 to be fitted in the groove 5a of the pipe 5.

According to the present embodiment, the ferrule 2 can be made simpler in construction than that of the first embodiment, reducing the number of components and lowering the manufacturing cost.

Next, the function of the third embodiment will be explained.

With the body 8 locked from turning, the cap nut 1 is screwed into the body 6 to a specific torque.

A thrust produced when the cap nut 1 is tightened into the body 8 is transmitted to the pipes 5 and 7 through the ferrule 2. The ferrule 2, being fitted in the groove 5a formed in the outer periphery of the pipe, can transmit the thrust to the pipe.

Furthermore, a set of pipes 5 and 7 are abutted against the gasket 4 placed therebetween, and are pressed for connection. The pipe end faces 5b and 7b have been finished by rubber burnishing, to thereby insure good gas tightness by close contact with the nickel gasket 4 which is deformed when compressed.

Figure 6:
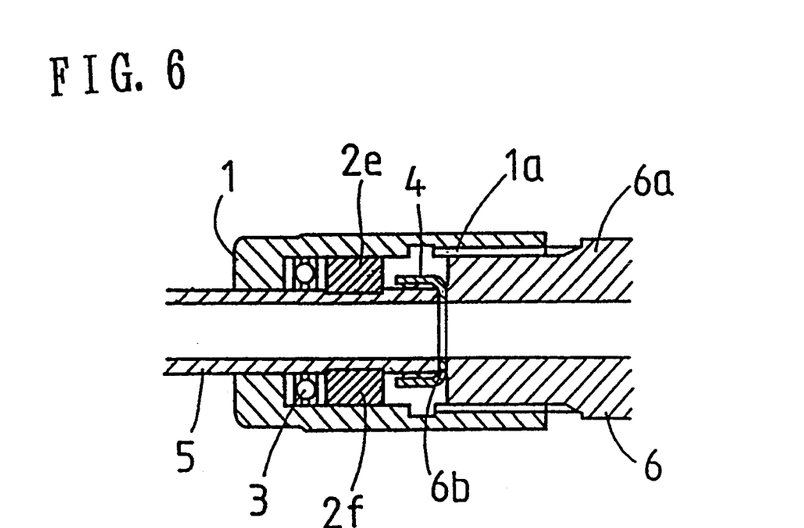
FIG. 6 is a sectional view showing the constitution of a part of a fluid coupling in a fourth embodiment according to the present invention.

Next, a fourth embodiment will be explained referring to FIGS. 6 and 7. A difference of the fourth embodiment from the first embodiment lies only in the shape of the ferrule, and therefore, the following explanation will be made primarily on the ferrule, and will not be made on other components.

Figure 7:
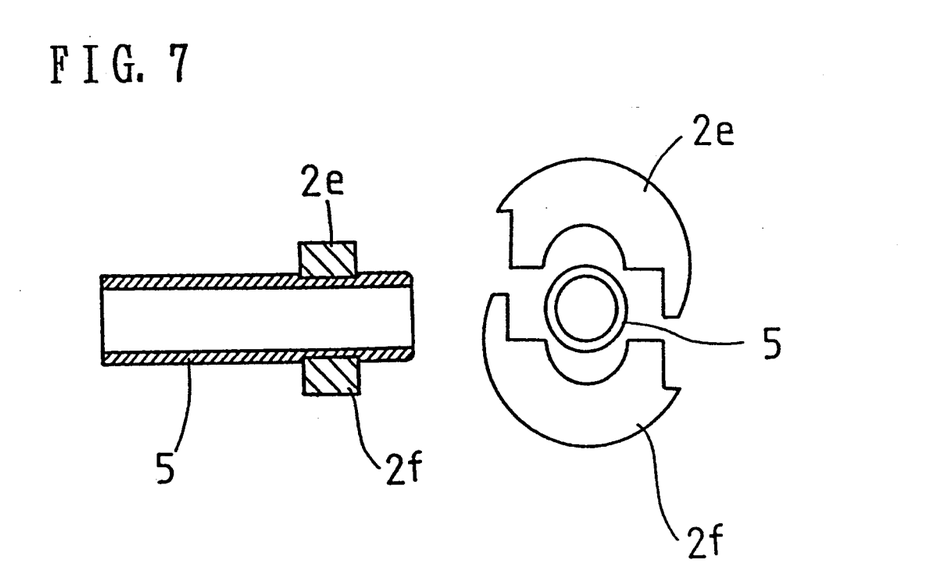
FIG. 7 is an exploded view showing the constitution of essential parts of the fourth embodiment.

The ferrule 2, as shown in FIG. 7, is composed of a combination of two ferrule parts 2e and 2f which can be disassembled in the radial direction of the axis.

The ferrule parts 2e and 2f can easily be installed in the groove 5a of the pipe 5 as compared with the ferrule of the first embodiment, and also can be removed very easily as compared with the first embodiment.

Next, the function of the fourth embodiment will be explained.

With the body 8 locked from rotation, the cap nut 1 is tightened to a specific torque.

With the tightening of the cap nut 1 to the body 6, the thrust is transmitted to the pipes 5 and 7 through the ferrule 2. The ferrule 2, being fitted in the groove 5a formed in the outer periphery of the pipe, can transmit a strong thrust to the pipes.

At this time, since the pipes 5 and 7 are positioned by the ferrule 2 with respect to the cap nut 1, the end face 5b of the first pipe and the end face 7b of the second pipe are properly aligned.

Also, a set of pipes 5 and 7 are abutted against the gasket 4 mounted therebetween, and pressed for connection. The pipe ends 5b and 7b have been finished by roller burnishing to thereby insure good gas tightness by close contact with the nickel gasket 4 which is deformed when compressed.

According to the above-described embodiment, as the fluid coupling of high gas tightness is employed, there will occur no danger even when poisonous gases are handled in the semiconductor manufacturing process.

The pipes can easily be disconnected by sliding in the axial direction after the removal of the cap nut; it is, therefore, possible to perform the maintenance of the fluid coupling with ease.

Figure 8:
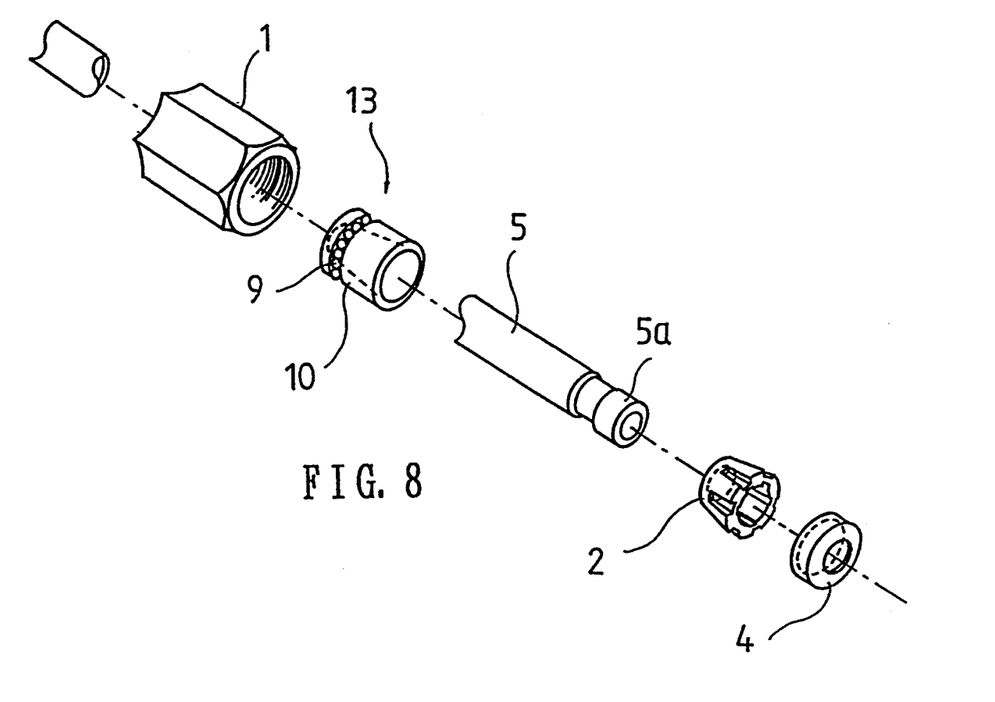
FIG. 8 is an exploded perspective view showing the constitution of essential parts of a fluid coupling in a fifth embodiment.

Next, a fifth embodiment will be explained referring to FIGS. 8 to 10.

A difference of this fifth embodiment from the first embodiment lies only in the shape of the ferrule. An explanation, therefore, will be given primarily on the ferrule, and not given on others. The constitution of a major component of the coupling is shown in the exploded perspective view of FIG. 8.

Figure 9:
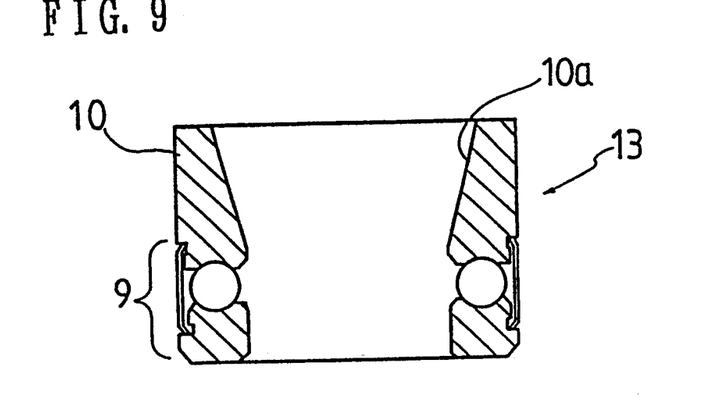
FIG. 9 is a sectional view of a first ferrule part.

The construction of the first ferrule part formed integrally with a thrust ball bearing 9 on one end will be shown in a sectional view of FIG. 9. A rotating ring 10 of the thrust ball bearing 9 is extended in a parallel direction, and an inclined surface 10a is formed in the extended inner surface of the rotating ring 10.

The first ferrule part 13 is fitted in the direction in which the stationary ring of the thrust ball bearing 9 contacts the inner end face of the cap nut 1 provided with the internal screw 1a inside.

Inside the first ferrule part 13 is installed the pipe 5. The end face part of the pipe 5 has been chamfered at the forward end as shown in FIG. 4, and the forward end face 5b has been mirror-finished by roller burnishing. The pipe 5 is provided with the groove 5a in the peripheral surface.

Figure 10A:
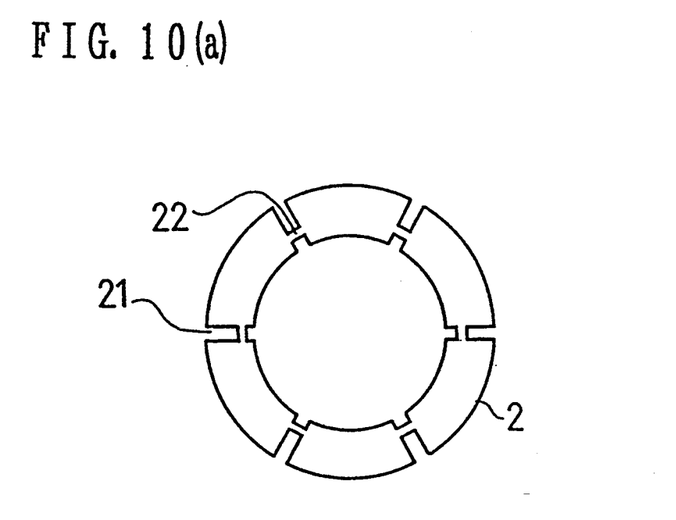
FIGS. 10(a) and 10(b) are a plan view and a side view of a sleeve.
Figure 10B:
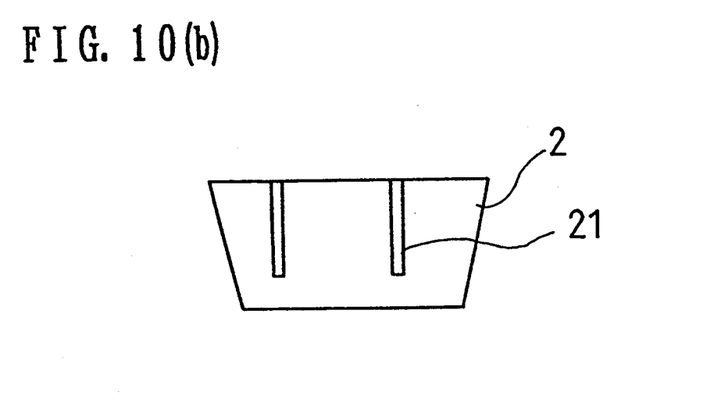

In the groove 5a is fitted the sleeve 2 which is the second ferrule part, as shown in FIG. 10. FIG. 10(a) is a plan view, and FIG. 10(b) is a side view.

The wedge-shaped inclination of the sleeve 2 is at the same angle as the inclination of the inner surface of the first ferrule part. In the outer periphery of the sleeve 2 are formed six grooves 22 equally spaced at 60 degrees. The outside wall 1b formed between the groove 1a and the inside diameter is 0.15 mm thick.

When the sleeve 2 is fitted in the groove 5a of the pipe 5, the outside diameter of the pipe 5 and the inside diameter of the sleeve 2 are almost the same; however, the sleeve 2, having six slits equally spaced in the outer periphery and as thin an outside wall 22 as 0.15 mm, can be elastically deformed for easy installation in the groove 5a.

Furthermore, since the thrust ball bearing 9 is formed on one end of the first ferrule part 3, the number of component parts can be decreased, thereby assisting in lessening a chance of trouble likely to occur in case of absence of a part.

Since the six slits 21 provided at an equal spacing on the circumference in the outer periphery of the sleeve 2, a uniform thrust of the sleeve 2 can be transmitted to the first ferrule part 3, thereby giving better contact of the pipes with the gasket 4.

In the above-described embodiment, a method for installing the ferrule in the groove cut in the outer surface of the pipe has been explained. It is, however, to be noted that this method for cutting the groove in the pipe may be replaced by any other method capable of transmitting the thrust between the ferrule and the pipe.

Figure 11:
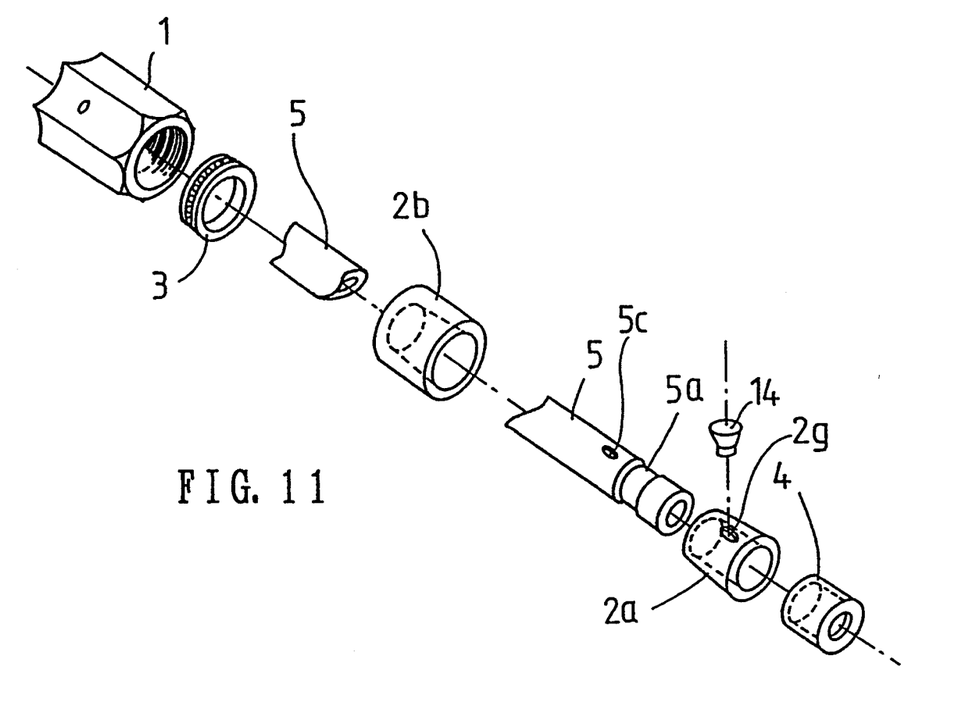
FIG. 11 is an exploded perspective view showing the constitution of essential parts of a fluid coupling in a sixth embodiment.

For example, there may be adopted a method, as a sixth embodiment, for drilling a hole in either of the pipe and the ferrule and installing an engaging pin into these holes as shown in FIG. 11.

A difference of this sixth embodiment from the first embodiment lies only in the method of engagement between the ferrule and the pipe, and therefore hereinafter an explanation will be made primarily on the method of engagement, and will not be given to others.

That is, in the case of the pipe, a through hole 5c is added by drilling in a position of the pipe a little apart from the forward end.

Also, the ferrule 2a is provided with a through hole 2g countersunk at a specific angle of inclination.

The pipe 5 is inserted into the ferrule 2g until these through holes 5c and 2g register perfectly and then an engaging pin 14 partly having the same angle of inclination as the through hole 2g of the ferrule 2 is fitted in these holes.

Next, the function of the sixth embodiment will be explained.

With the body 8 locked from rotation, the cap nut 1 is tightened to a specific torque.

A thrust produced when the cap nut 1 is tightened into the body 8 is transmitted to the pipes 5 and 7 through the ferrule 2. Since the ferrule 2a and the pipe 5 are engaged by means of the engaging pin 14, a great thrust can be transmitted to the pipe 5 from the ferrule 2.

At this time, the pipes 5 and 7 are positioned by the ferrule 2 with respect to the cap nut 1, and therefore, the end face 5b of the first pipe and the end face 7b of the second pipe will be exactly aligned.

Also, a set of pipes 5 and 7 are abutted against the gasket 4 placed therebetween and pressed for connection. The pipe end faces 5b and 7b have been finished by roller burnishing, to thereby insure good gas tightness by close contact with the nickel gasket 4 which is deformed when compressed.

The foregoing description of the preferred embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments chosen and described in order to explain the principles of the present invention and its practical application to enable one skilled in the art to utilize the present invention in various embodiments and with various modifications are suited to the particular use contemplated. It is intended that the scope of the present invention be defined by the claims appended thereto and their equivalents.

What is claimed is:

1. A fluid coupling comprising:
    a hollow, cylindrical cap nut having an inner end face and an internal surface with a threaded portion forming an internal screw;
    a hollow, cylindrical pipe having an end face with a mirror-finished surface and an external surface having a circumferential groove formed therein;
    means for preventing rotation of said pipe when said cap nut is rotated, in contact with the inner end face of said cap nut;
    a ferrule fitted in said circumferential groove in contact with said rotation preventing means for transmitting to said pipe a thrust of said cap nut in the longitudinal direction of said pipe;
    a gasket having a side contacting said end face of said pipe; and
    a hollow, cylindrical body having an end face with a mirror-finished surface and an external surface with a threaded portion forming an external screw;

said mirror-finished surface of said end face of said body being in contact with another side of said gasket opposite the side which is in contact with said pipe;

said external screw of said body and said internal screw of said cap nut being tightened to a specific torque.

2. A fluid coupling as defined in claim 1, wherein said ferrule is hollow and frustra-conical in shape and wedge-shaped in section, with an end face having the larger area in contact with said means for preventing rotation of said pipe, and having longitudinal slits formed therein.

3. A fluid coupling as defined in claim 1, wherein said ferrule further comprises:

a first ferrule part being hollow and frustra-conical in shape and wedge-shaped in cross section and having longitudinal slits formed therein, wherein an end face of said first ferrule having the smaller area being positioned on said rotation preventing means; and a second ferrule part being hollow and frustra-conical in shape and trapezoidal in cross section, wherein an end face of said second ferrule part having the larger area contacting said rotation preventing means.

4. A fluid coupling as defined in claim 3, wherein said first ferrule part has at least two slits equally spaced.

5. A fluid coupling as defined in claim 3, wherein said means for preventing rotation of said pipe and said second ferrule part are formed as an integral unit.

6. A fluid coupling as defined in claim 1, wherein said ferrule is composed of a combination of at least two ferrule parts which can be disassembled in a radial direction of a longitudinal axis of said pipe.

7. A fluid coupling comprising:

a hollow, cylindrical cap nut having an inner end face and an internal surface with a threaded portion forming an internal screw;

a first hollow, cylindrical pipe having an end face with a mirror-finished surface and an external surface having a circumferential groove formed therein;

means for preventing rotation of said first pipe when said cap nut is rotated, in contact with the inner end face of said cap nut;

a first ferrule for transmitting to said first pipe a thrust of said cap nut in a longitudinal direction of said pipe, fitted in said groove of said first pipe and in contact with said means for preventing rotation of said first pipe;

a hollow, cylindrical body having an end face and an external surface with a threaded portion forming an external screw;

a second hollow, cylindrical pipe having an end face with a mirror-finished surface and an external surface having a circumferential groove formed therein;

means for preventing rotation of said second pipe when said cap nut is rotated, in contact with the end face of said body;

a second ferrule fitted in said groove of said second pipe, in contact with said means for preventing rotation of said second pipe, for transmitting to said second pipe a thrust of said cap nut in the longitudinal direction of said second pipe; and a gasket between the end face of said first pipe and the end face of said second pipe;

said external screw of said body and said internal screw of said cap nut being tightened to a specified torque.

8. A fluid coupling as defined in claim 7, wherein each said first ferrule and said second ferrule is hollow and frustra-conical in shape and wedge-shaped in section, with an end face having the larger area in contact with corresponding said means for preventing rotation of said pipe, and having longitudinal slits formed therein.

9. A fluid coupling as defined in claim 7, wherein said first and second ferrule each further comprises:

a first ferrule part being hollow and frustra-conical in shape and wedge-shaped in cross section and having longitudinal slits formed therein, wherein an end face of said first ferrule part having the smaller area being positioned on a corresponding means for preventing rotation of said pipe;

a second ferrule part being hollow and frustra-conical in shape and trapezoidal in cross section, wherein an end face of said second ferrule part having the larger area contacting a corresponding means for preventing rotation of said pipe.

10. A fluid coupling as defined in claim 9, wherein said first ferrule parts have at least two slits equally spaced.

11. A fluid coupling as defined in claim 9, wherein said means for preventing rotation of said first pipe and said corresponding second ferrule part are formed as an integral unit;

wherein said means for preventing rotation of said second pipe and said corresponding second ferrule part are formed as an integral unit.

12. A fluid coupling as defined in claim 7, wherein each said first ferrule and second ferrule is composed of at least two ferrule parts which can be disassembled in a radial direction of a longitudinal axis of said first pipe and said second pipe.

* * * * *